(12) United States Patent
Hong

(10) Patent No.: US 11,326,502 B2
(45) Date of Patent: May 10, 2022

(54) EXHAUST FUMES REDUCTION DEVICE FOR INTERNAL COMBUSTION ENGINE

(71) Applicant: Geum Pyo Hong, Incheon (KR)

(72) Inventor: Geum Pyo Hong, Incheon (KR)

( * ) Notice: Subject to any disclaimer, the term of this patent is extended or adjusted under 35 U.S.C. 154(b) by 0 days.

(21) Appl. No.: 17/139,143

(22) Filed: Dec. 31, 2020

(65) Prior Publication Data

US 2021/0332736 A1    Oct. 28, 2021

(30) Foreign Application Priority Data

Apr. 27, 2020 (KR) .................. 10-2020-0050463

(51) Int. Cl.
*F01N 13/08* (2010.01)

(52) U.S. Cl.
CPC ........ *F01N 13/082* (2013.01); *F01N 2470/30* (2013.01)

(58) Field of Classification Search
CPC .... F01N 2240/20; F01N 1/086; F01N 3/2892; F02B 31/04
See application file for complete search history.

(56) References Cited

U.S. PATENT DOCUMENTS

| | | | | |
|---|---|---|---|---|
| 1,377,472 A * | 5/1921 | Gibson | ............... | F01N 1/12 181/263 |
| 2,185,489 A * | 1/1940 | Wilman | ............... | F01N 1/12 181/247 |
| 3,227,240 A * | 1/1966 | Lee | ............... | B64F 1/26 181/217 |
| 4,339,918 A * | 7/1982 | Michikawa | ........... | F01N 13/082 181/279 |
| 4,792,014 A * | 12/1988 | Shin-Seng | ............ | F01N 13/082 181/227 |
| 5,058,704 A * | 10/1991 | Yu | ............. | F01N 1/10 181/262 |
| 5,971,097 A * | 10/1999 | Etheve | ...................... | F01N 3/05 181/227 |
| 7,637,099 B2 * | 12/2009 | Ranganathan | .......... | F01N 13/20 60/298 |
| 10,428,711 B2 * | 10/2019 | Zhang | ................... | B01F 5/0614 |
| 2005/0205355 A1 * | 9/2005 | Lin | ............... | F01N 1/10 181/279 |
| 2013/0205759 A1 * | 8/2013 | Gardner | .................... | F01N 3/05 60/319 |
| 2019/0085800 A1 * | 3/2019 | Yoo | ...................... | F02M 35/104 |

FOREIGN PATENT DOCUMENTS

| | | |
|---|---|---|
| KR | 1020160118096 A | 10/2016 |
| KR | 101952142 B1 | 2/2019 |

* cited by examiner

*Primary Examiner* — Anthony Ayala Delgado
(74) *Attorney, Agent, or Firm* — Rabin & Berdo, P.C.

(57) ABSTRACT

Provided is an exhaust fumes reduction device for an internal combustion engine. The device reduces the generation of exhaust fumes and improves output and fuel efficiency by smoothing the discharge flow of exhaust gas in a state additionally mounted at the end of an exhaust line of an internal combustion engine. The exhaust fumes reduction device includes; a housing pipe connected to the end of the exhaust port to discharge exhaust gas; a vortex pipe mounted inside the housing pipe to increase the speed of the exhaust gas introduced into the housing pipe and discharge the exhaust gas spirally; and an external pipe mounted on the outside of the housing pipe and in communication with the housing pipe to allow the outside air to flow in and to assist the smooth discharge of exhaust gas discharged to the housing pipe.

5 Claims, 3 Drawing Sheets

EXHAUST FUMES REDUCTION DEVICE FOR INTERNAL COMBUSTION ENGINE

TECHNICAL FIELD

The present invention relates to an exhaust fumes reduction device for an internal combustion engine. More particularly, the present invention relates to reducing the generation of exhaust fumes and improving output and fuel efficiency by smoothing the discharge flow of exhaust gas in a state additionally mounted at the end of an exhaust line of an internal combustion engine used for ships, vehicles, and various industrial machines.

BACKGROUND OF ART

In modern society, interest in the environment is quite high. Recently, environmental problems caused by a series of fine dust are emerging, and interest in air quality is increasing. In the case of automobiles, ships, or industrial machines that use internal combustion engines, when the internal combustion engine is aged, exhaust gas contains lots of exhaust fumes, so it is being pointed out as a target that generates pollution and fine dust.

Accordingly, the research of reduction on exhaust noise and emission is actively being conducted in the development of various internal combustion engines such as vehicles and ships, and there is a trend of further strengthening regulations for reducing greenhouse gas and suppressing the occurrence of harmful elements of pollution.

Meanwhile, as is well known, a device using an internal combustion engine obtains power by four cycles of suction, compression, explosion, and exhaust. Looking at the flow of air (intake, exhaust) in the strokes, when passing through an air cleaner and throttle valve, etc. in the suction stroke, inflow of air occurs without relatively great resistance.

However, in the exhaust stroke, since it is discharged to the outside through an exhaust manifold, an air purifier using a catalyst and a tail pipe (exhaust pipe) of a muffler, considerable resistance occurs to the exhaust flow of exhaust gas.

In addition, in the process of being discharged from the cylinder of the internal combustion engine to the tail pipe of the muffler, there is a period when the so-called valve overlap occurs in which the intake valve and the exhaust valve are momentarily simultaneously opened during the four strokes of the internal combustion engine. In the opening moment of the valves, the exhaust gas discharged into the exhaust manifold is re-introduced into the cylinder. Then, a vacuum state is instantaneously formed in the exhaust manifold and thereby forming primary exhaust pressure that hinders the discharge of exhaust gas.

In addition, in the three-dimensional catalyst device, which is an air purifier, the flow velocity of the exhaust gas is significantly reduced while passing through the fine ventilation holes of the honeycomb-type exhaust gas purifier, thereby forming secondary exhaust pressure. When the exhaust gas is flowed into the muffler to have multiple partitions, a tertiary exhaust pressure is formed.

Due to the resistance of the exhaust process, the exhaust gas of the internal combustion engine cannot be discharged smoothly, and thus about 20~25% of the output is reduced. Accordingly, it is possible to improve the output of the internal combustion engine and improve the fuel efficiency simply by smoothly discharging the exhaust gas.

In order to somewhat solve these problems, in Korean Patent publication No. 10-2016-0118096, the vortex for an internal combustion engine comprises; a first vortex portion comprising a first housing communicating with the internal combustion engine, and a first central passage portion being located inside the first housing and having a first central hole formed in the center, and a first fixed vortex fan formed to more than one, positioned between the first housing and the first central passage portion and connected to the first housing and the first central passage portion; a second vortex portion comprising a second housing coupled to the inner side of the first housing formed in the first vortex portion through a force-fitting method to use heat, a second central passage portion located inside the second housing and having a second central hole formed in the center and a second fixed vortex fan formed to more than one, positioned between the second housing and the second central passage portion and connected to the second housing and the second central passage portion, wherein the rear surface of the second vortex part is coupled to the rear surface of the first vortex part, and the first fixed vortex fan formed in the first vortex part and the second fixed vortex fan formed in the second vortex part are alternately arranged and coupled to each other. The vortex for an internal combustion engine has a problem in that it is difficult to form a smooth vortex of the exhaust gas due to a pressure drop when the exhaust gas is discharged because the structure of the vortex fan and the area occupied by the vortex fan and the central passage portion are large.

Korean Patent No. 10-1952142 relates to a vortex generator equipped with a case to generate multiple tornadoes. The vortex generator capable of generating multiple tornadoes is able to increase intake and exhaust efficiency by installing an air vortex generator in internal combustion engines of automobiles, aircraft, ships, and various industrial machinery and inducing the flow of high speed to convert the intake and exhaust air into a vortex. A vortex generator comprises the body formed in the direction of the air flow inside the intake pipe so that the air sucked into the internal combustion engine forms a vortex, and a plurality of wings portion coupled to the outer circumferential surface of the body. The body is a hollow cylindrical or hollow polygonal column, and a coupling groove of a plurality of long holes is formed in the longitudinal direction of the body on the outer circumferential surface of the body. The coupling groove of long holes is formed to be inclined with respect to the longitudinal direction of the body, and the wing portion is formed with one end coupled to the coupling groove of the long hole and the other end not coupled to the coupling groove of the long hole, and is formed to wrap the body in clockwise or counterclockwise. Since the vortex generator also has a large area occupied by the wing portion, there is a problem that the pressure acting on the exhaust gas may increase.

In addition, a vortex pipe is used for smooth discharge of the exhaust gas formed in the conventional techniques. There are problems such as obstructing the smooth flow of exhaust gas. The exhaust gas generates noise due to the pressure drop of the exhaust gas according to the shape of the vortex pipe, or secondary back pressure can be generated by the vortex pipe. The noise and secondary back pressure obstruct the smooth flow of the exhaust gas.

In addition, since the exhaust gas is not discharged smoothly, there is a problem that the generation of exhaust fumes increases and the efficiency of the internal combustion engine decreases.

DISCLOSURE

Technical Problem

To solve the above problems, an object of the present invention is to provide the exhaust fumes reduction device for internal combustion engine capable of reducing the exhaust fumes generated during discharging the exhaust gas by smoothing the exhaust gas discharged through the exhaust gas outlet of the internal combustion engine.

In addition, another object of the present invention is to provide the exhaust fumes reduction device for internal combustion engine capable of improving the output and increasing the fuel efficiency of the internal combustion engine by discharging the exhaust gas to increase speed of the exhaust gas and preventing the re-inflow of the exhaust gas generated by the valve overlap to the engine.

In addition, another object of the present invention is to provide exhaust fumes reduction device for an internal combustion engine capable of reducing the generation of exhaust fumes due to delayed discharge of the exhaust gas by smoothing the discharge of exhaust gas discharged through the exhaust pipe.

Technical Solution

In order to achieve the above object of the present invention there is provided the exhaust fumes reduction device for internal combustion engine mounted at the end of an exhaust pipe of the internal combustion engine to smooth the discharge flow of exhaust gas comprising; a housing pipe connected to the end of the exhaust pipe to discharge exhaust gas; a vortex pipe mounted inside the housing pipe to increase the speed of the exhaust gas introduced into the housing pipe and discharge the exhaust gas spirally; and an external pipe mounted on the outside of the housing pipe and in communication with the housing pipe to allow the outside air to flow in and to assist the smooth discharge of exhaust gas discharged to the housing pipe.

A spiral guide ring is further mounted between the external pipe and the housing pipe to discharge spirally the air introduced into the external pipe.

The housing pipe includes: a housing pipe body having a predetermined length, which is mounted at an end of an exhaust pipe of a vehicle to discharge exhaust gas; a front-side air outlet port formed in a plurality on front-side of the housing pipe body to allow outside air to flow in; a rear-side air outlet port formed in a plurality on the rear-side of the housing pipe body to allow outside air to flow in; and a plurality of vortex pipe support pins formed on inner circumferential surfaces of the front-side and rear-side of the housing pipe to fix the vortex pipe while maintaining a predetermined distance from the housing pipe body.

The vortex pipe includes: an inlet part fixed by the front vortex pipe support pin at a predetermined position inside the front side of the housing pipe body; a venturi part formed by reducing the diameter on a rear side of the inlet part; and an outlet part of the shape of which the diameter is enlarged from the rear of the venturi part and the diameter becomes narrower toward the rear end; and a plurality of vanes formed on the outlet part to be cut in a predetermined length from the rear end to the front side; wherein the vane is bent at a certain angle from the front end of the vane to the rear end of the vane based on the cutout portion of the vane, so that the speed increases as the exhaust gas hitting the vane rotates.

The external pipe comprises an external pipe body, and a housing pipe support pin radially formed on the front and rear inside circumferential surfaces of the external pipe body to fix the spiral guide ring and the housing pipe.

Advantageous Effects

The exhaust fumes reduction device for an internal combustion engine of the present invention has the effect of increasing the discharge capacity and the exhaust speed of the exhaust gas by causing the exhaust gas discharged to the outside through the exhaust gas outlet of the internal combustion engine to be rapidly discharged by generating a spiral vortex.

In addition, the exhaust fumes reduction device for an internal combustion engine according to the present invention has an advantage in that the exhaust gas emission efficiency is increased and the generation of exhaust fumes due to the discharge delay of exhaust gas can be reduced because the discharge is rapidly performed.

In addition, the exhaust fumes reduction device for an internal combustion engine of the present invention has an advantage to allow the smooth discharge of the exhaust gas to increase the speed of the exhaust gas discharged through the housing pipe and the vortex pipe by the external air introduced at high speed through the external pipe.

MODES OF THE INVENTION

Figure 1:
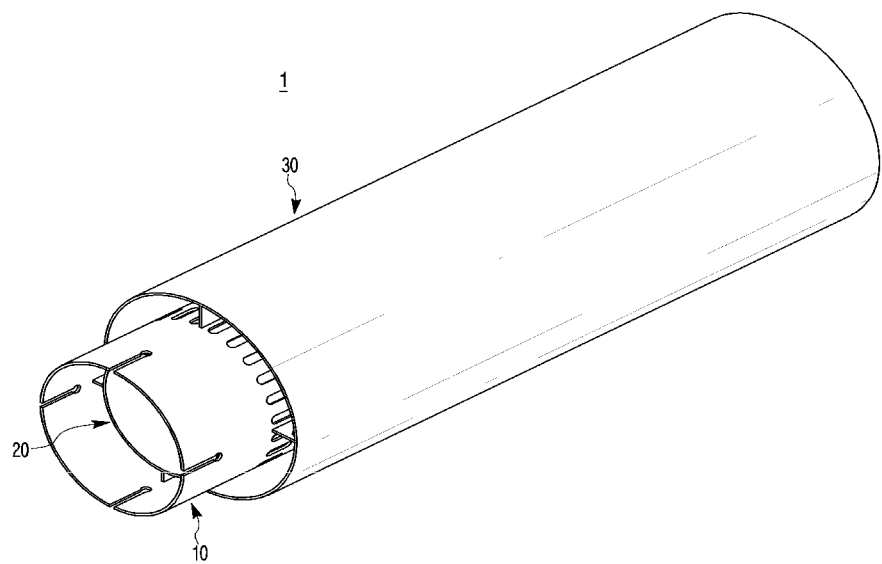
FIG. 1 is a perspective view of an exhaust fumes reduction device for an internal combustion engine according to the present invention.

Hereinafter, preferred embodiments of the present invention will be described in detail with reference to the accompanying drawings to the extent that a person with ordinary skill in the art to which the invention pertain is able to easily implement the present invention. First, when reference numerals refer to components of each drawing, it is to be noted that although the same components are illustrated in different drawings, the same components are denoted by the same reference numerals as possible. In addition, in the description of the present invention, a detailed explanation of related known configurations or functions will be omitted when it is determined to obscure the subject matter of the present invention.

Figure 2:
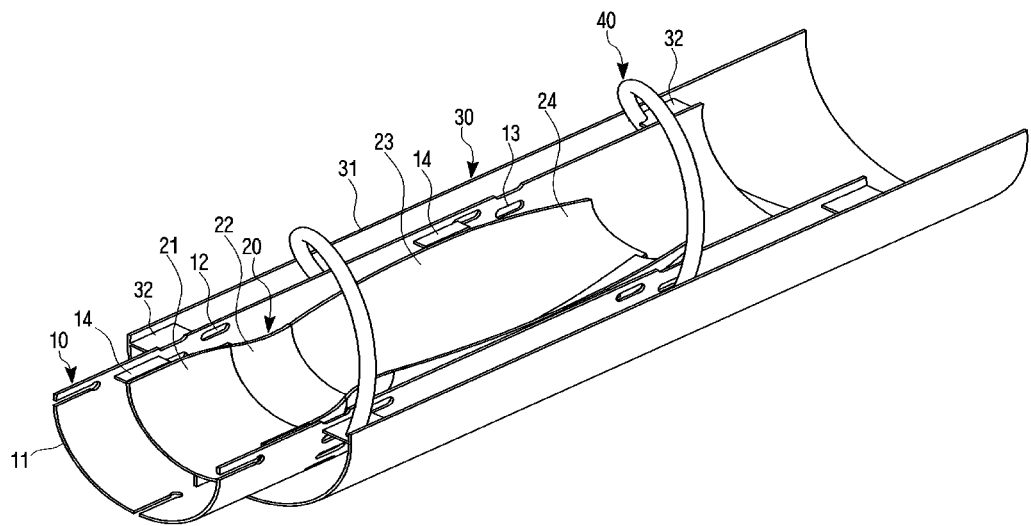
FIG. 2 is a cut-away perspective view of an exhaust fumes reduction device for an internal combustion engine according to the present invention.
Figure 3:
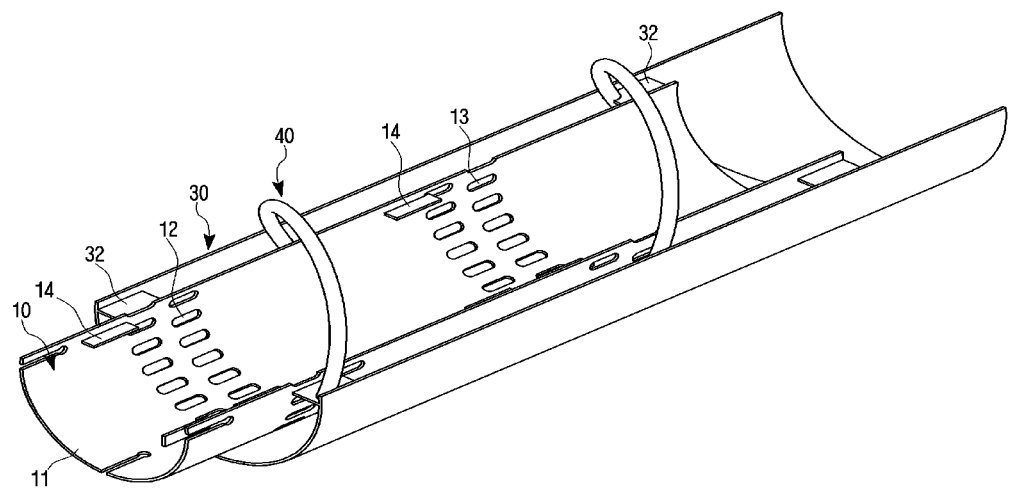
FIG. 3 is a perspective view of a state in which the vortex pipe is removed from the exhaust fumes reduction device for an internal combustion engine according to the present invention.
Figure 4:
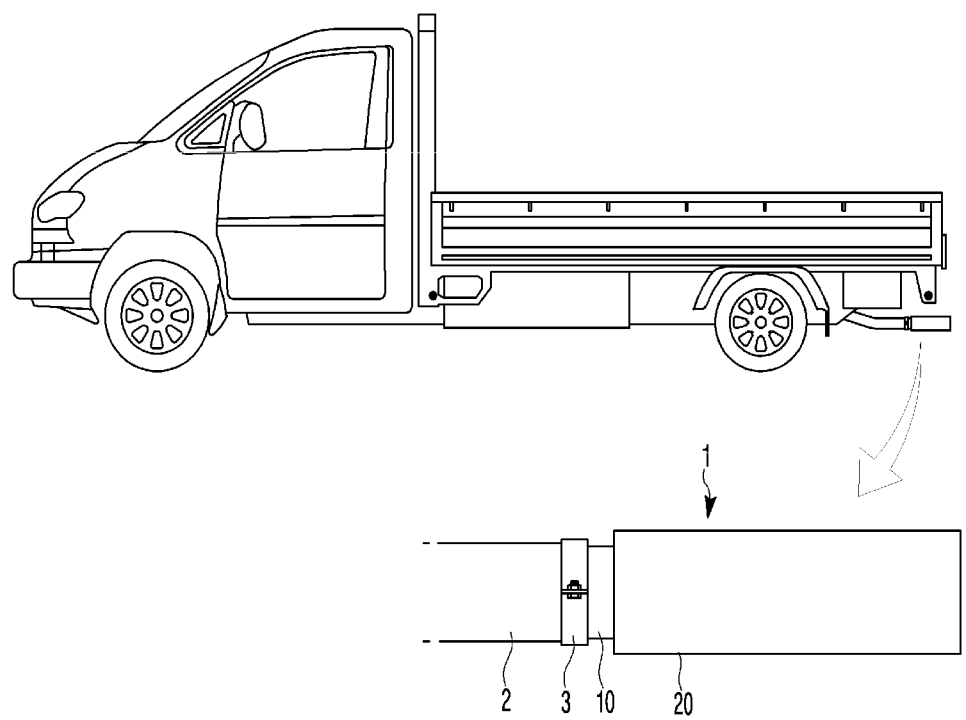
FIG. 4 is a side view showing that the exhaust fumes reduction device for an internal combustion engine according to the present invention is mounted on the exhaust pipe of the vehicle.
Figure 5:
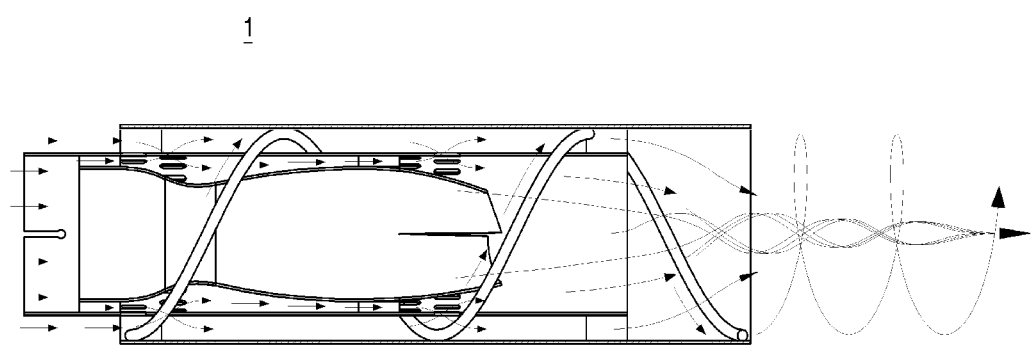
FIG. 5 is an air flow state diagram showing the flow of air in the exhaust fumes reduction device for an internal combustion engine according to the present invention.

FIG. 1 is a perspective view of an exhaust fumes reduction device for an internal combustion engine according to the present invention, and FIG. 2 is a cut-away perspective view of an exhaust fumes reduction device for an internal combustion engine according to the present invention, and FIG. 3 is a perspective view of a state in which the vortex pipe is removed from the exhaust fumes reduction device for an internal combustion engine according to the present invention, and FIG. 4 is a side view showing that the exhaust fumes reduction device for an internal combustion engine according to the present invention is mounted on the exhaust pipe of the vehicle, and FIG. 5 is an air flow state diagram showing the flow of air in the exhaust fumes reduction device for an internal combustion engine according to the present invention.

As shown in FIG. 1, the exhaust fumes reduction device 1 for an internal combustion engine according to the present invention includes a housing pipe 10 through which exhaust gas is introduced and discharged in a state connected to an exhaust pipe 2 at the end of the muffler of the vehicle, a vortex pipe 20 that is mounted inside the housing pipe 10 at predetermined intervals and allows the exhaust gas passing through the housing pipe 10 to be discharged while generating a vortex, and an external pipe 30 that is mounted outside of the housing pipe 10 and is to facilitate the smooth discharge of the exhaust gas discharged through the housing pipe 10 by introducing outside air.

The housing pipe 10 is a means for proceeding efficiently the exhaust gas discharge flow at the end of the exhaust pipe 2 of the automobile shown as an example in FIG. 4. As shown in FIG. 2, the housing pipe 10 is an discharge pipe through which the moving flow of exhaust gas discharged to the outside through the exhaust pipe 2 of the muffler is completed by the exhaust stroke among the four strokes. The housing pipe 10 comprises a housing pipe body 11 that the front side connected to the exhaust pipe 2 is fixed using a band 3 and the introduced exhaust gas is discharged, a vortex tube support pin 14 mounted in the front side and rear side of the inner circumferential surface of the housing tube body 11 so that the vortex pipe 20 can be mounted at predetermined intervals inside the housing pipe body 11, and a front outside-air inlet holes 12 and a rear outside-air inlet holes 13 to smoothly discharge exhaust gas through the housing pipe by the outside-air introduced through the external pipe 30. The front outside-air inlet holes 12 and the rear outside-air inlet holes 13 are radially formed in the housing pipe body 11 at predetermined intervals. The vortex pipe support pin 14 inside the housing tube is mounted in a number of radially on the front side and the rear side to support and fix the vortex pipe 20.

The vortex pipe 20 is for controlling the flow rate of the exhaust gas so that the exhaust gas discharged through the housing pipe 10 can be discharged while rotating spirally. As shown in FIG. 2, the discharge flow of the exhaust gas is configured to have the shape of a venturi tube so as to increase the speed while forming a spiral vortex. Specifically, the vortex pipe 20 has an inlet portion 21 that is fixed to the vortex pipe support pin 14 formed on the front side of the housing pipe body 11 and is extended by a predetermined length to the rear side, a venturi portion 22 that is formed with the reducing diameter at the rear of the inlet portion 21, and an discharge portion 23 whose diameter becomes increasing gradually by predetermined length from the rear of the venturi portion 22 and reducing gradually from the end of the increased diameter toward the rear end. In the discharge portion 23, a plurality of vanes 24 cut in a predetermined length from the rear end to the front side are formed, and a predetermined angle is bent gradually from the front end to the rear end of the vane 24 based on the cut portion of the vane 24, and the exhaust gas striking the vane 24 is configured to be discharged at an increased speed while rotating in a spiral. The vortex pipe 20 forms a vane 24 to build a spiral vortex of the exhaust gas. Since the exhaust gas strikes the vane 24 and is discharged, the exhaust gas must be discharged while rotating in a spiral. In addition, the vortex pipe 20 forms a venturi portion 22 to increase the speed of the exhaust gas to be discharged, and the venture portion 22 increases the speed of the exhaust gas, and after passing through the venturi portion 22, while passing through the discharge portion 23 again, the speed of the exhaust gas increases, and while striking the vane 24, it rotates in a spiral and is discharged. That is, when passing through the venturi portion 22 and the discharge portion 23, the diameter that the exhaust gas passes gradually decreases, so according to Bernoulli's theorem, it is discharged in increased speed and a spiral vortex. Thereby the discharge rate of the exhaust gas is increased, and fuel efficiency can be increased by smooth discharge of exhaust gas. That is, since exhaust gas is discharged smoothly, it is possible to prevent the exhaust gas from flowing back into the engine, thereby increasing fuel efficiency and reducing the generation of exhaust fumes due to delay in the discharge of the exhaust gas.

FIG. 2 and FIG. 3, the external pipe 30 is mounted on the outside of the housing pipe 10, and because it is located outside the housing pipe 10, outside-air is able to be introduced through the external pipe 30. That is, the external pipe 30 and the housing pipe 10 are formed in the form of a double pipe, the exhaust gas is discharged through the housing pipe 10, and the outside-air is introduced by a running vehicle through the external pipe 30. As the speed of the vehicle increases, the speed of introducing the outside-air increases, and when the speed of the outside-air increases, the pressure of the external pipe 30 decreases. The external pipe 30 is formed with an external pipe body 31 and a housing pipe support pin 32 for fixing the housing pipe 10 on the front and rear sides of the external pipe body 31, and the housing pipe support pin 32, and the housing pipe 10 is fixed to the housing pipe support pin 32. The housing pipe 10 and the external pipe 30 are maintained at a predetermined distance by the housing pipe support pin 32.

As shown in FIG. 3, a spiral guide ring 40 may be further mounted inside the external pipe 30. The spiral guide ring 40 is mounted between the external pipe 30 and the housing pipe 10, and is fixed to the housing pipe support pin 32 to fix the position. The outside-air introduced into the external pipe 30 can be discharged in a spiral by the spiral guide ring 40, and since it is discharged in a spiral, it can pass through the external pipe 30 at a higher speed.

The operation of the exhaust fumes reduction device 1 for an internal combustion engine according to the present invention having the above configuration will be described in detail as follows.

As shown in FIG. 5, to maximize the exhaust efficiency and to improve the fuel economy thereby can be achieved by additionally mounting the exhaust gas reduction device 1 for an internal combustion engine according to the present invention to the end of the exhaust pipe 2 of the vehicle muffler so that the flow of the exhaust discharge forms a spiral vortex.

As shown in FIG. 5, by stepping on the accelerator pedal while the driver starts driving the internal combustion engine equipped with the exhaust fumes reduction device 1 of the present invention, the vehicle can be driven, that is, four strokes (suction, compression, explosion, exhaust) of the internal combustion engine are in progress, and exhaust gas is discharged through the exhaust pipe 2 according to the exhaust stroke among these four strokes, and the exhaust gas discharged is induced to the spiral vortex passing through the housing pipe 10 and the vortex pipe 20 with finally being discharged to outside. In addition, since the diameters of the housing pipe 10 and the vortex pipe 20 through which the exhaust gas passes are reduced in two steps, then expanded and reduced again, the configuration of the vortex pipe 20 is formed according to the principle of the venturi tube. As the exhaust gas is discharged along to the vortex pipe 20, the discharge speed of the exhaust gas increases, and the speed increases more as it passes through the discharge portion 14 and is discharged in a spiral vortex, thereby increasing the discharge efficiency of the exhaust gas. That is, since the exhaust gas can be discharged more easily and much more during the same time, the possibility of reverse flow of the exhaust gas or the like can be prevented in advance with an increase in the amount of exhaust gas, so that fuel economy improvement can be achieved.

In addition, as shown in FIG. 5, since the housing pipe 10 is spaced apart from the vortex tube 20 by a predetermined distance, exhaust gas can be discharged between the housing pipe 10 and the vortex pipe 20. When the exhaust gas discharged between the housing pipe 10 and the vortex pipe 20 is slower than the speed of the outside-air discharged through the external pipe 30, the exhaust gas is discharged from the front outside-air inlet 12 and the rear outside-air inlet 13 to the external pipe 30, and the exhaust gas may be discharged more rapidly by the speed of the outside-air discharged. Accordingly, it has the effect of increasing the exhaust efficiency.

In addition, when the speed of the outside-air discharged through the external pipe 30 is less than the speed of the exhaust gas discharged through the housing pipe 10, the outside-air flows into the housing pipe 10, and the exhaust gas is discharged together with the introducing the outside-air.

In addition, the outside-air is discharged in a spiral by the spiral guide ring 40 mounted on the external pipe 30, and the frictional force acting on the outside-air may be reduced by being discharged in a spiral, and the speed of the outside-air is increased because the frictional force is reduced. Accordingly, when the speed of the outside-air is increased, the exhaust gas discharged through the housing pipe 10 flows into the external pipe 30 so that the exhaust gas can be discharged smoothly. Accordingly, the exhaust efficiency is increased, and as the exhaust efficiency of the exhaust gas increases, it is possible to bring effects such as exhaust fumes reduction and fuel economy increase.

In addition, by inducing smooth exhaust of exhaust gas by using a vortex-type flow that naturally occurs while driving a vehicle without a separate driving device, the engine's exhaust performance and energy efficiency are improved, and various parts installed in the intake and exhaust system improve the durability of parts and reduces exhaust noise. In addition, various problems caused by exhaust gas not being discharged to the exhaust pipe in time and delayed discharge may be solved.

The above description is just illustrative of the technical idea of the present invention, and those of ordinary skill in the art to which the present invention pertains can make various modifications, changes, and substitutions within the scope not departing from the essential characteristics of the present invention. Therefore, the embodiments disclosed in the present invention and the accompanying drawings are not intended to limit the technical idea of the present invention, but are for description, and the scope of the technical idea of the present invention is not limited by these embodiments and the accompanying drawings. The protective scope of the present invention should be construed based on the following claims, and all technical ideas within the equivalent scope thereof should be construed as being included in the scope of the present invention.

What is claimed is:

1. An exhaust fumes reduction device for an internal combustion engine mounted at an end of an exhaust pipe of the internal combustion engine to smooth a discharge flow of exhaust gas comprising;
    a housing pipe connected to the end of the exhaust pipe to discharge the exhaust gas;
    a vortex pipe mounted inside the housing pipe to increase a speed of the exhaust gas introduced into the housing pipe and discharge the exhaust gas spirally; and
    an external pipe with a cross-sectional circumference greater than a cross-sectional circumference of the housing pipe, the external pipe being mounted on an outside of the housing pipe and in communication with the housing pipe to allow outside air to flow in and to assist smooth discharge of exhaust gas discharged to the housing pipe.

2. The exhaust fumes reduction device for the internal combustion engine of claim 1,
    wherein a spiral guide ring is further mounted between the external pipe and the housing pipe to discharge spirally air introduced into the external pipe.

3. An exhaust fumes reduction device for an internal combustion engine mounted at an end of an exhaust pipe of the internal combustion engine to smooth a discharge flow of exhaust gas comprising;
    a housing pipe connected to the end of the exhaust pipe to discharge the exhaust gas;
    a vortex pipe mounted inside the housing pipe to increase a speed of the exhaust gas introduced into the housing pipe and discharge the exhaust gas spirally; and
    an external pipe mounted on an outside of the housing pipe and in communication with the housing pipe to allow outside air to flow in and to assist smooth discharge of exhaust gas discharged to the housing pipe;
    wherein the housing pipe includes:
    a housing pipe body having a predetermined length, which is mounted at the end of the exhaust pipe of the vehicle to discharge the exhaust gas;
    a front-side air outlet port formed in a plurality on a front side of the housing pipe body to allow the outside air to flow in;
    a rear-side air outlet port formed in a plurality on a rear side of the housing pipe body to allow the outside air to flow in; and
    a plurality of vortex pipe support pins formed on inner circumferential surfaces of the front side and rear side of the housing pipe to fix the vortex pipe while maintaining a predetermined distance from the housing pipe body; and
    wherein a spiral guide ring is further mounted between the external pipe and the housing pipe to discharge spirally air introduced into the external pipe.

4. The exhaust fumes reduction device for the internal combustion engine of claim 3,
    wherein the vortex pipe includes:
    an inlet part fixed by a front vortex pipe support pin at a predetermined position inside the front side of the housing pipe body;
    a venturi part formed by reducing a diameter on a rear side of the inlet part; and
    an outlet part having a shape in which a diameter is enlarged from a rear of the venturi part and becomes narrower toward a rear end, wherein a plurality of vanes formed on the outlet part have a cutout portion of a predetermined length from the rear end to the front side; and wherein a vane is bent at a certain angle from a front end of the vane to a rear end of the vane based on the cutout portion of the vane, so that the speed increases as exhaust gas hitting the vane rotates.

5. The exhaust fumes reduction device for internal combustion engine of claim 4, wherein the external pipe comprises an external pipe body, and a housing pipe support pin radially formed on front and rear inside circumferential surfaces of the external pipe body to fix the spiral guide ring and the housing pipe.

* * * * *